(12) United States Patent
Natsuko et al.

(10) Patent No.: US 6,252,599 B1
(45) Date of Patent: Jun. 26, 2001

(54) IMAGE DISPLAY METHOD AND IMAGE DISPLAY APPARATUS

(75) Inventors: Sato Natsuko; Azemoto Shogo; Gono Makoto, all of Tokyo; Minami Manabu, Kanagawa, all of (JP)

(73) Assignee: GE Yokogawa Medical Systems, Limited, Tokyo (JP)

( * ) Notice: Subject to any disclaimer, the term of this patent is extended or adjusted under 35 U.S.C. 154(b) by 0 days.

(21) Appl. No.: 09/080,176

(22) Filed: May 16, 1998

(30) Foreign Application Priority Data

Aug. 26, 1997 (JP) .................................................. 9-230039

(51) Int. Cl.⁷ .................................................. G06T 15/00
(52) U.S. Cl. .................................................. 345/419
(58) Field of Search .................................... 345/418, 419, 345/420, 421, 422, 423, 427

(56) References Cited

U.S. PATENT DOCUMENTS

| | | | |
|---|---|---|---|
| 5,608,849 | * 3/1997 | King, Jr. ................................. | 345/419 |
| 5,920,319 | * 7/1999 | Vining et al. ........................ | 345/419 |
| 5,963,209 | * 10/1999 | Hoppe ................................. | 345/419 |
| 5,966,132 | * 10/1999 | Kakizawa et al. .................... | 345/419 |
| 5,990,900 | * 11/1999 | Seago ................................. | 345/419 |
| 6,009,188 | * 12/1999 | Cohen et al. ........................ | 345/419 |

* cited by examiner

Primary Examiner—Cliff N. Vo
(74) Attorney, Agent, or Firm—Moonray Kojima

(57) ABSTRACT

In order to simultaneously display surface and internal conditions, an endoscope mode three-dimensional (3D) image T is displayed along with a peripheral image C which is a tomographic image of the periphery of the 3D image T. Moreover, in order to display reference images synchronously with change of field-of-view direction, a tomographic image in a cross section perpendicular to the field-of-view direction line is produced and displayed as a synchro axial image.

18 Claims, 15 Drawing Sheets

IMAGE DISPLAY METHOD AND IMAGE DISPLAY APPARATUS

BACKGROUND OF THE INVENTION

The present invention relates to an image display method and an image display apparatus in which surface and internal conditions of an examined object can be simultaneously displayed.

A method conventionally practiced in diagnostic medical applications comprises: acquiring data for the human internal tissue by image information acquisition means such as an X-ray CT (Computed Tomography) apparatus or a magnetic resonance image diagnostic apparatus; storing once the acquired data in image information storage means such as a magnetic tape, a magnetic disc, an optical disc or a semiconductor memory; randomly accessing the image information storage means to reconstruct an appropriate tomographic image; and displaying the image on display means such as a CRT.

The prior art includes a technique in which an X-ray CT apparatus or the like is employed to scan a plurality of slices to acquire a plurality of tomographic images which are used to produce an image closely resembling one viewed by endoscope observation. The technique has been disclosed by the present Applicant in Japanese Patent Application No. 8-187185 (1996).

In the above conventional technique, the surface condition of the internal wall etc. of the internal body tissue such as intestine tissue is represented when a three-dimensional (3D) image as viewed from a virtual endoscope is displayed. However, the combined representation thereof with information on the internal of tissue such as information on the internal of tissues composing the wall surface of the intestine, to continue with the above example, has not been possible.

That is, there is a problem that only the surface condition can be represented, but the internal condition which allows physicians to recognize, for example, how deep a tumor reaches inside the tissue, cannot be represented.

Moreover, although the above method allows an operator to arbitrarily change the field-of-view (FOV) centerline direction, it is difficult for the operator to spatially recognize the current FOV centerline direction, because reference images (axial, sagittal and coronal images) are not displayed synchronously with the change of the FOV centerline direction.

SUMMARY OF THE INVENTION

It is an object of the present invention to provide an image display method and an image display apparatus in which surface and internal conditions can be simultaneously displayed.

It is another object of the invention to provide an image display method and an image display apparatus in which the surface and internal conditions can be simultaneously displayed, and reference images (axial, sagittal and coronal images) can also be displayed synchronously with the change of the FOV centerline direction.

In accordance with a first aspect, the present invention provides an image display method comprising the steps of: producing a three-dimensional (3D) image representing a wall surface of 3D tissue as seen from a viewpoint lying in the internal space formed by the 3D tissue; producing a tomographic image at a cross-sectional location defined as lying near the viewpoint or a two-dimensional (2D) image obtained by processing the tomographic image; and displaying the tomographic image or the 2D image juxtaposed or superimposed with the 3D image.

By using the image display method in accordance with the first aspect, a 3D image (e.g., an endoscope mode 3D image) representing 3D tissue as seen from a viewpoint is displayed, and simultaneously, a tomographic image near the viewpoint or a 2D image obtained by processing the tomographic image is displayed. Thus, the surface and internal conditions can be simultaneously displayed.

In accordance with a second aspect, the present invention provides an image display apparatus comprising: 3D image production means for producing a 3D image representing a wall surface of 3D tissue as seen from a viewpoint lying in the internal space formed by the 3D tissue; 2D image production means for producing a tomographic image at a cross-sectional location defined as lying near the viewpoint or a two-dimensional (2D) image obtained by processing the tomographic image; and image display means for displaying the tomographic image or the 2D image juxtaposed or superimposed with the 3D image.

By using the image display apparatus in accordance with the second aspect, the image display method in accordance with the first aspect can be suitably practiced. Thus, the surface and internal conditions, for example, of a tumor developed on the wall of the large intestine, can be simultaneously displayed.

In accordance with a third aspect, the present invention provides the image display apparatus as described regarding the second aspect, wherein the 3D image production means produces the 3D image from data sets for a plurality of tomography images involving the 3D tissue.

In accordance with a fourth aspect, the present invention provides the image display apparatus as described regarding the third aspect, wherein the 3D image production means defines the viewpoint and a field-of-view (FOV) centerline direction from the viewpoint, or additionally, with a solid angle from the viewpoint to produce the 3D image.

In accordance with a fifth aspect, the present invention provides the image display apparatus as described regarding the fourth aspect, wherein the 3D image production means employs one of the plurality of tomographic images to define the viewpoint.

In accordance with a sixth aspect, the present invention provides the image display apparatus as described regarding the third aspect, wherein the 2D image production means employs one of the plurality of tomographic images.

In accordance with a seventh aspect, the present invention provides the image display apparatus as described regarding the third aspect, wherein the 2D image production means produces the 2D image by performing an interpolation calculation on the tomographic image.

In accordance with an eighth aspect, the present invention provides the image display apparatus as described regarding the fourth aspect, wherein the 2D image is perpendicular to the FOV centerline direction.

In accordance with a ninth aspect, the present invention provides the image display apparatus as described regarding the fourth aspect, wherein, when at least one of the viewpoint, the FOV centerline direction and the solid angle is changed, the 3D image production means and the 2D image production means produce a new 3D image and a new 2D image, respectively, according to the change.

In accordance with a tenth aspect, the present invention provides an image display method comprising the steps of:

producing a 3D image representing a wall surface of 3D tissue as seen from a viewpoint lying in the internal space formed by the 3D tissue; producing a tomographic image in a plane (referred to as a synchro axial plane hereinbelow) perpendicular to the FOV centerline direction and containing a cross-sectional location defined as lying at or near the viewpoint, a tomographic image in a plane orthogonal to the synchro axial plane and containing the FOV centerline, or a 2D image obtained by processing the tomographic images; and displaying the tomographic images or the 2D image juxtaposed or superimposed with the 3D image.

By using the image display method in accordance with the tenth aspect, a 3D image (e.g., an endoscope mode 3D image) representing 3D tissue as seen from a viewpoint is displayed, and simultaneously, a tomographic image (which represents an axial image) in a plane perpendicular to a FOV centerline direction at that time, a tomographic image (comprising an image which represents a sagittal image or coronal image) in a plane orthogonal to that plane, or a 2D image obtained by processing the tomographic images is displayed. That is, reference images (axial, sagittal and coronal images) can be displayed synchronously with the change of the FOV centerline direction.

In accordance with an eleventh aspect, the present invention provides an image display apparatus comprising: 3D image production means for producing a 3D image representing a wall surface of 3D tissue as seen from a viewpoint lying in the internal space formed by the 3D tissue; 2D image production means for producing a tomographic image in a plane (referred to as a synchro axial plane hereinbelow) perpendicular to a FOV centerline direction and containing a cross-sectional location defined as lying at or near the viewpoint, a tomographic image in a plane orthogonal to the synchro axial plane and containing the FOV centerline, or a 2D image obtained by processing the tomographic images; and image display means for displaying the tomographic images or the 2D image juxtaposed or superimposed with the 3D image.

By using the image display apparatus in accordance with the eleventh aspect, the image display method in accordance with the tenth aspect can be suitably practiced. Thus, reference images (axial, sagittal and coronal images) can be displayed synchronously with the change of the FOV centerline direction.

In accordance with a twelfth aspect, the present invention provides the image display apparatus as described regarding the eleventh aspect, wherein the 3D image production means produces the 3D image from data sets for a plurality of tomography images involving the 3D tissue.

In accordance with a thirteenth aspect, the present invention provides the image display apparatus as described regarding the twelfth aspect, wherein the 3D image production means defines the viewpoint and the FOV centerline direction from the viewpoint, or additionally, with a solid angle from the viewpoint to produce the 3D image.

In accordance with a fourteenth aspect, the present invention provides the image display apparatus as described regarding the thirteenth aspect, wherein the 3D image production means employs one of the plurality of tomographic images to define the viewpoint.

In accordance with a fifteenth aspect, the present invention provides the image display apparatus as described regarding the eleventh aspect, wherein the 2D image is produced by performing an interpolation calculation on the tomographic images in a plurality of synchro axial planes.

In accordance with a sixteenth aspect, the present invention provides the image display apparatus as described regarding the eleventh aspect, wherein the tomographic image in a plane orthogonal to the synchro axial plane corresponds to a variable position of the plane.

That is, the tomographic image in a plane orthogonal to the synchro axial plane moves with respect to a position in the FOV centerline direction, and a tomographic image at the moved position is displayed.

In accordance with a seventeenth aspect, the present invention provides the image display apparatus as described regarding the sixteenth aspect, wherein a position corresponding to the tomographic image in the synchro axial plane is displayed on the tomographic image in a plane orthogonal to the synchro axial plane or on the 2D image obtained by processing the tomographic image.

Thus, a position corresponding to the tomographic image in the synchro axial plane can be found on the tomographic image in a plane orthogonal to the synchro axial plane or on the 2D image obtained by processing the tomographic image.

In accordance with an eighteenth aspect, the present invention provides the image display apparatus as described regarding the eleventh aspect, wherein, when at least one of the viewpoint, the FOV centerline direction and the solid angle is changed, the 3D image production means and the 2D image production means produce a new 3D image, and a new tomographic image in the synchro axial plane and a new tomographic image in a plane orthogonal to the synchro axial plane or a new 2D image obtained by processing the tomographic images, respectively, according to the change.

Thus, when the viewpoint etc. are changed, a new 3D image, and a new tomographic image in the synchro axial plane and a new tomographic image in a plane orthogonal to the synchro axial plane or a new 2D image obtained by processing the tomographic images can be displayed.

Thus, according to the image display method and the image display apparatus of the present invention, a 3D image (e.g., a so-called endoscope mode 3D image) representing 3D tissue as seen from a viewpoint and an additional 2D image representing a region corresponding to the periphery of the 3D image are displayed, thereby enabling the surface and internal conditions to be simultaneously displayed. Moreover, reference images (axial, sagittal and coronal images) can be displayed synchronously with the change of the FOV centerline direction, which enables the operator to spatially recognize the current FOV centerline direction clearly.

Further objects and advantages of the present invention will be apparent from the following description of the preferred embodiments of the invention as illustrated in the accompanying drawings.

DETAILED DESCRIPTION OF THE INVENTION

First Embodiment

The present invention will now be described in more detail with reference to embodiments shown in the accompanying drawings.

Figure 1:
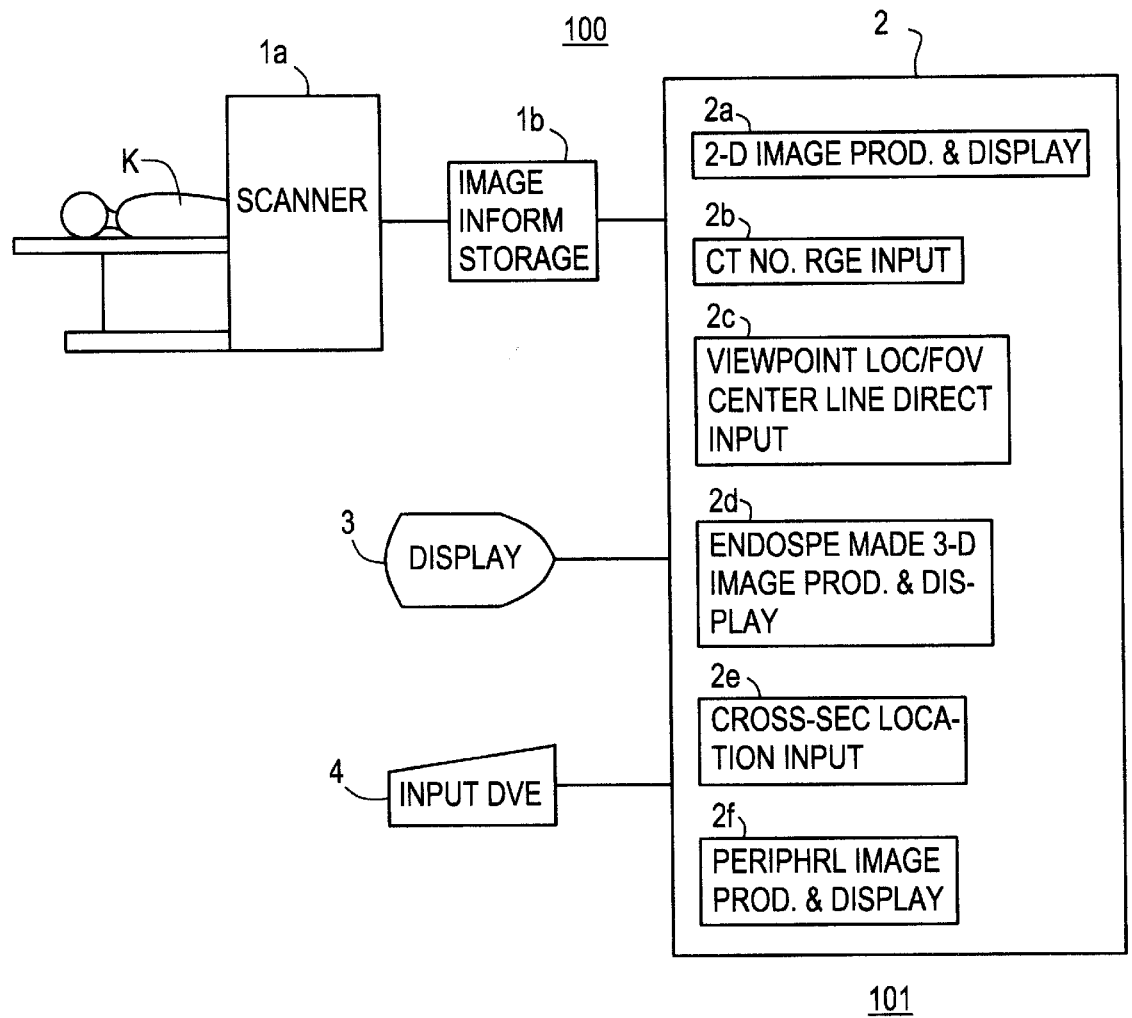
FIG. 1 is a configuration diagram showing an image display apparatus in accordance with a first embodiment of the present invention.

FIG. 1 is a configuration diagram showing an image display apparatus in accordance with a first embodiment of the present invention in combination with image information acquisition means and image information storage means in an X-ray CT apparatus.

An image display apparatus 101 of the present invention comprises an image processor 2, a display 3 and an input device 4.

The image processor 2 includes a two-dimensional (2D) image production and display portion 2a, a CT number range input portion 2b, a viewpoint location/field-of-view (FOV) centerline direction input portion 2c, an endoscope mode three-dimensional (3D) image production and display portion 2d, a cross-sectional location input portion 2e and a peripheral image production and display portion 2f.

A scanner 1a scans a patient K at different slice locations (a slice refers to a planar region imaged by tomography) and acquires scan data for a plurality of slices.

Image storage means 1b stores the scan data.

The 2D image production and display portion 2a in the image processor 2 processes the scan data for the plurality of slices to generate 2D image data for each slice, and displays a 2D image on the display 3.

The operator reads from the 2D image a CT number range of the internal body structure (such as ventriculus or blood vessel) of which the endoscope mode 3D image is to be produced, and inputs the CT number range via the input device 4.

The CT number range input portion 2b in the image processor 2 receives the input CT number range and passes it to the endoscope mode 3D image production and display portion 2d.

The operator determines a viewpoint location (a virtual endoscope lens position) in the internal space of the internal body tissue and inputs the viewpoint location via the input device 4. A FOV centerline direction (an optical axis direction of a virtual endoscope lens) is also input via the input device 4.

The viewpoint location/FOV centerline direction input portion 2c in the image processor 2 receives the input viewpoint location and FOV centerline direction and passes them to the endoscope mode 3D image production and display portion 2d.

The endoscope mode 3D image production and display portion 2d in the image processor 2 extracts from the 2D image data for each slice the pixels within the CT number range in the FOV which extends radially from the viewpoint toward the FOV centerline direction to produce a 3D image as viewing a wall surface of the internal body tissue, and displays the 3D image on the display 3.

The operator determines a cross-sectional location within a predetermined range lying near the viewpoint location, and inputs the cross-sectional location via the input device 4.

The cross-sectional location input portion 2e in the image processor 2 receives the input cross-sectional location and passes it to the peripheral image production and display portion 2f.

Figure 8:
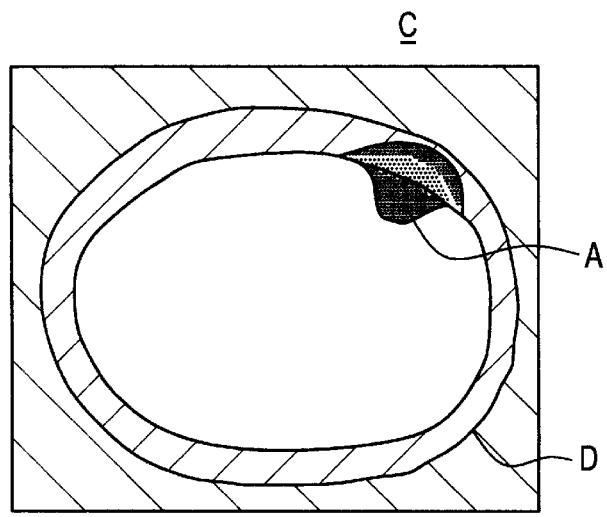
FIG. 8 is a conceptual diagram illustrating a peripheral image obtained by the image display apparatus shown in FIG. 1.

The peripheral image production and display portion 2f in the image processor 2 produces a tomographic image of a cross section perpendicular to the FOV centerline at the cross-sectional location based on the 2D image data, and produces a peripheral image (see FIG. 8) obtained by removing the 3D image region from the tomographic image, to display the tomographic image on the display 3.

Figure 3:
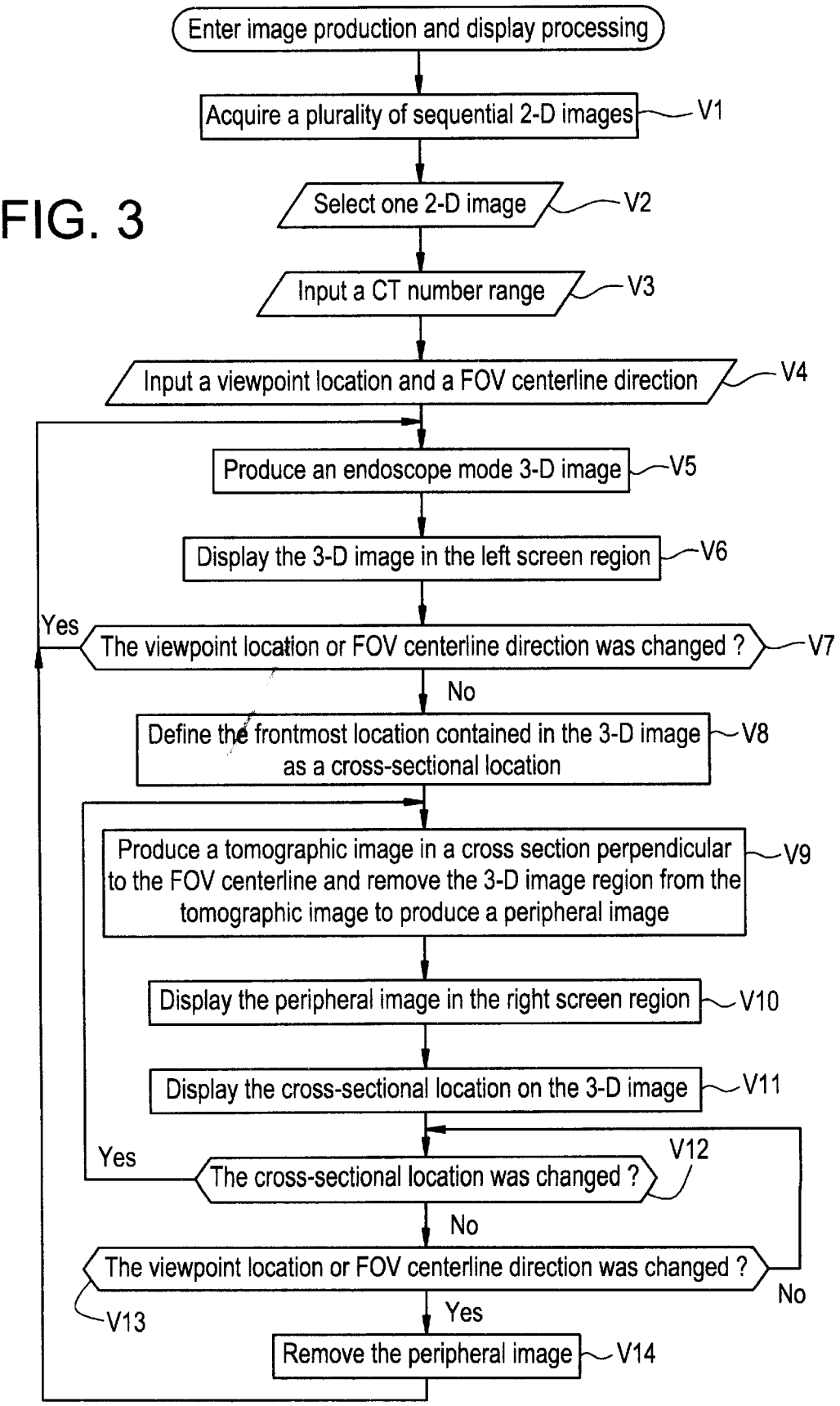
FIG. 3 is a flow chart of a procedure in which the image display apparatus shown in FIG. 1 is employed to display an endoscope mode 3D image.

FIG. 3 is a flow chart of a procedure in which the image display apparatus 101 is employed to display the endoscope mode 3D image.

In Step V1, the patient K is scanned at different slice locations, and data sets for a plurality of sequential 2D images are acquired.

Figure 4:
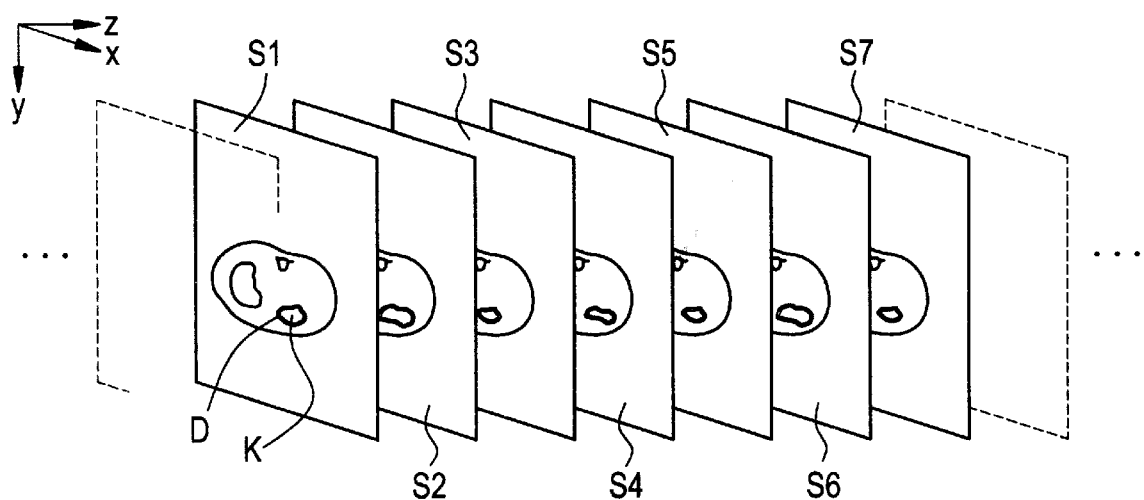
FIG. 4 is a schematic diagram showing a plurality of 2D images on which a 3D image is based.

The sequential 2D images S1–S7 are illustrated in FIG. 4.

In the 2D images S1–S7, reference symbol D designates the large intestine. Reference symbol K designates the lumen, i.e., the internal space of the large intestine D.

Each 2D image S1–S7 is a tomographic image in a plane perpendicular to the z-axis. The z-axis is the axis along which the patient K is moved in the scanner 1, the x-axis is the horizontal axis perpendicular to the z-axis, and the y-axis is the vertical axis perpendicular to the z-axis.

Referring to FIG. 3 again, in Step V2, the operator selects an appropriate 2D image from the sequential images using the input device 4. For example, the image S5 is selected from among the 2D images S1–S7.

In Step V3, the operator reads from the selected 2D image a CT number range of the internal body tissue (e.g., the large intestine) of which the endoscope mode 3D image is to be produced, and inputs the CT number range. For example, if the CT number range of the pixels in the large intestine D in the 2D image S5 is "equal to or above 300", "300" is input as the minimum value of the CT number range (and, if necessary, the maximum value may be input).

Figure 5:
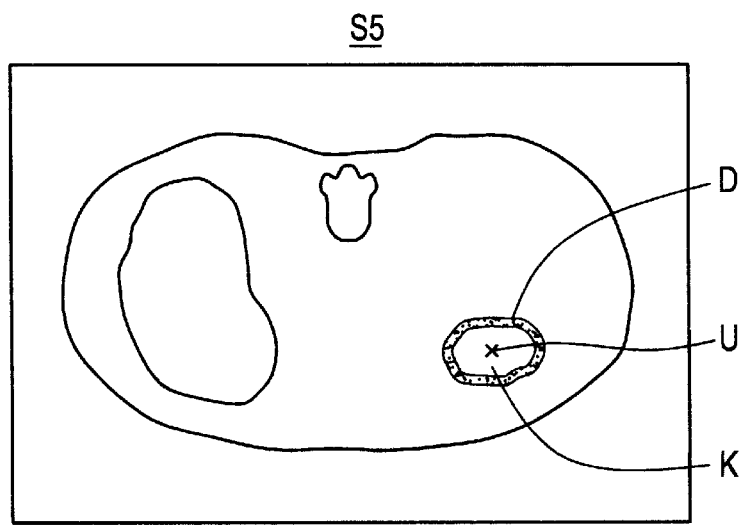
FIG. 5 is an explanatory diagram illustrating a screen for input of a viewpoint on the 2D image.

In Step V4, the operator determines a viewpoint location in the internal space of the internal body tissue and inputs the viewpoint location. For example, as shown in FIG. 5, a cursor U is positioned at a point within the lumen K, the internal space of the large intestine D, and the position is selected. The FOV centerline direction is also input. For example, the "depth direction" of the displayed 2D image is specified.

Figure 2:
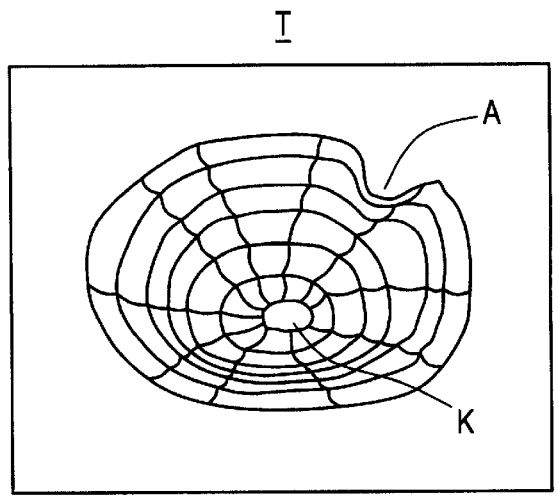
FIG. 2 is a schematic diagram showing a 3D image obtained by the image display apparatus shown in FIG. 1.

Referring FIG. 3 again, in Step V5, the endoscope mode 3D image production and display portion 2d in the image processor 2 extracts from the 2D image data for each slice the pixels within the CT number range in the FOV which extends radially from the viewpoint toward the FOV centerline direction to produce a 3D image as viewing a wall surface of the internal body tissue. For example, the 3D image T shown in FIG. 2 is produced. In the drawing, reference symbol A designates a tumor developed on the wall of the large intestine D.

Figure 6:
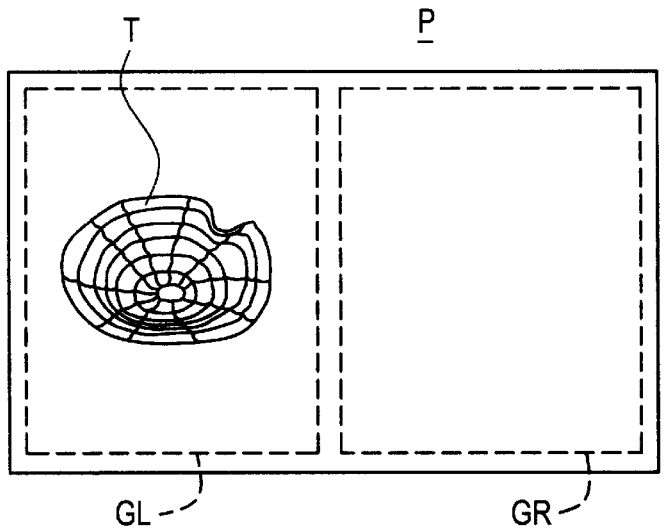
FIG. 6 is an explanatory diagram illustrating display of the 3D image by the image display apparatus shown in FIG. 1.

Referring to FIG. 3 again, in Step V6, the endoscope mode 3D image production and display portion 2d in the image processor 2 displays the 3D image T in the left screen region GL on the display 3 as shown in FIG. 6.

In Step V7, a check is made whether the operator changed the viewpoint location or the FOV centerline direction. If a change was made, the process returns to Step V5 to update the 3D image; otherwise it goes to Step V8. That is, while the viewpoint location or the FOV centerline direction is being changed, the 3D image continues to be varied according to the change, and when the change is stopped at a certain 3D image, the process goes to Step V8.

In Step V8, the peripheral image production and display portion 2f in the image processor 2 defines the frontmost location contained in the 3D image as a cross-sectional location.

Figure 7:
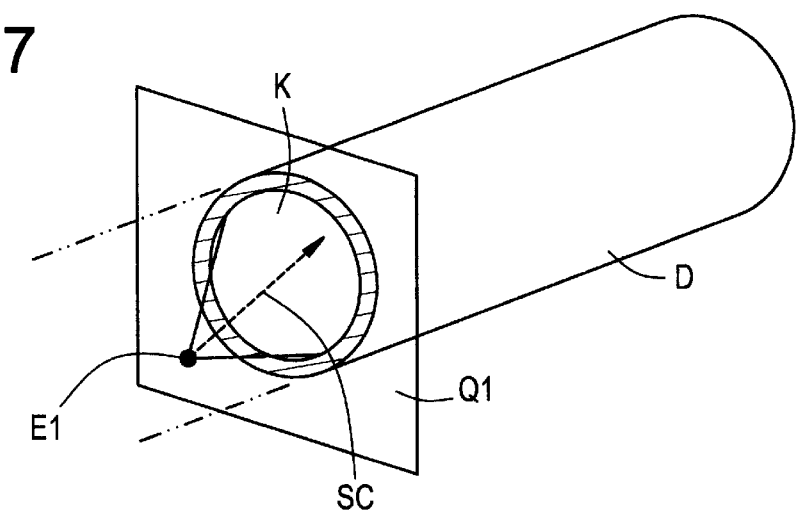
FIG. 7 is an explanatory diagram illustrating the positional relationship between a viewpoint and a cross section.

In Step V9, the pixels in a cross section perpendicular to the FOV centerline at the cross-sectional location are extracted from the 2D image data to produce a tomographic image. For example, as shown in FIG. 7, a part of the wall of the large intestine D which is contained in the FOV and lies in the location nearest to the viewpoint E1 is defined as a cross section Q1, for which a tomographic image is produced. Then the 3D image region is removed from the tomographic image to produce the peripheral image C shown in FIG. 8.

Figure 9:
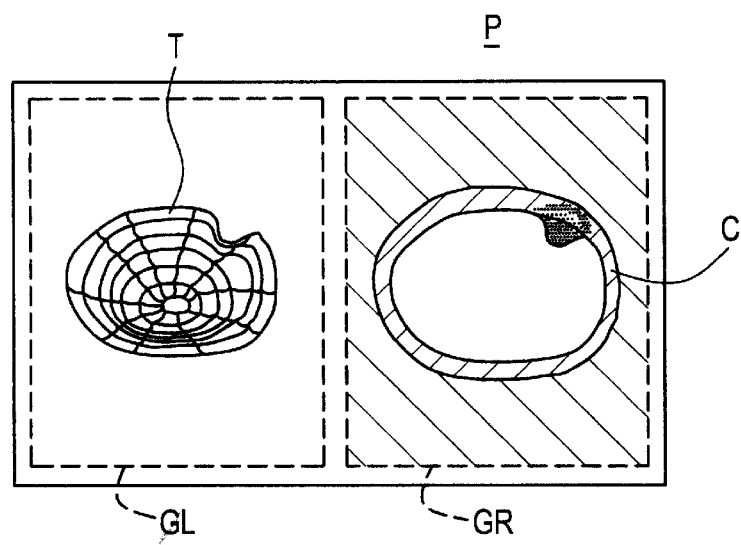
FIG. 9 is an explanatory diagram illustrating display of the 3D image and the peripheral image by the image display apparatus shown in FIG. 1.

Referring to FIG. 3 again, in Step V10, the peripheral image production and display portion 2f in the image processor 2 displays the peripheral image C in the right screen region GR on the display 3 as shown in FIG. 9.

Figure 10:
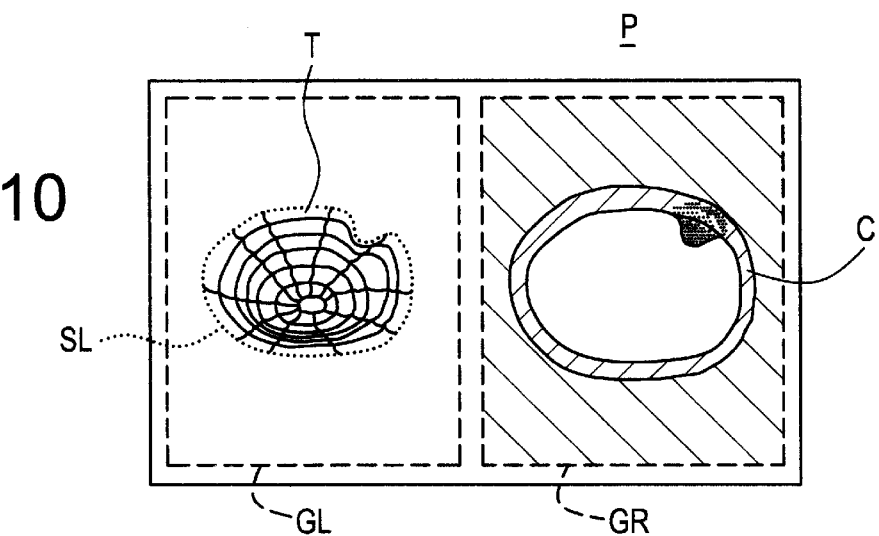
FIG. 10 is an explanatory diagram illustrating display of the 3D image, the peripheral image and a cross-sectional location by the image display apparatus shown in FIG. 1.

Referring to FIG. 3 again, in Step V11, a cross-sectional location indication SL is displayed on the 3D image T as shown in FIG. 10.

Figure 11:
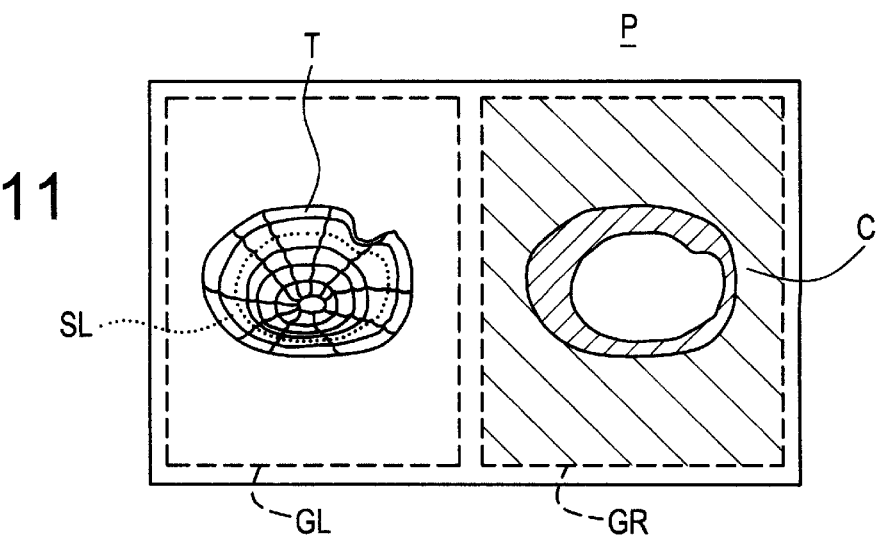
FIG. 11 is an explanatory diagram illustrating another display of the 3D image, the peripheral image and a cross-sectional location by the image display apparatus shown in FIG. 1.

In Step V12, a check is made whether the operator changed the cross-sectional location. If a change was made, the process returns to Step V5 to update the peripheral image, and displays the peripheral image in Step V10 and the cross-sectional location indication in Step 11. For example, if the cross-sectional location is moved toward the depth direction, the display as shown in FIG. 11 is formed.

In Step V13, a check is made whether the operator changed the viewpoint location or the FOV centerline direction. If a change was not made, the process returns to Step V12 to maintain the current display; otherwise it goes to Step V14.

In Step V14, the peripheral image C is removed to restore the display as shown in FIG. 6. The process then returns to Step V5. That is, when the viewpoint location or the FOV centerline direction was changed, the 3D image T is varied according to the change, and while the 3D image T is being varied, the peripheral image C is not displayed.

By using the image display apparatus 101 in accordance with the first embodiment, the endoscope mode 3D image T is displayed in the left screen region on the display 3, and the peripheral image C is displayed in the right screen region when the viewpoint is fixed, which enables the surface condition and the internal condition (such as CT numbers of the internal of tissue) of the tumor A to be simultaneously displayed.

Moreover, in Step V10, the tomographic image may be displayed just as it is. Furthermore, in Step V9, a cross-sectional image of the internal body tissue in a cross section perpendicular to the FOV centerline at the cross-sectional location may be produced based on the 3D data to display the cross-sectional image in Step V10.

Second Embodiment

Figure 12:
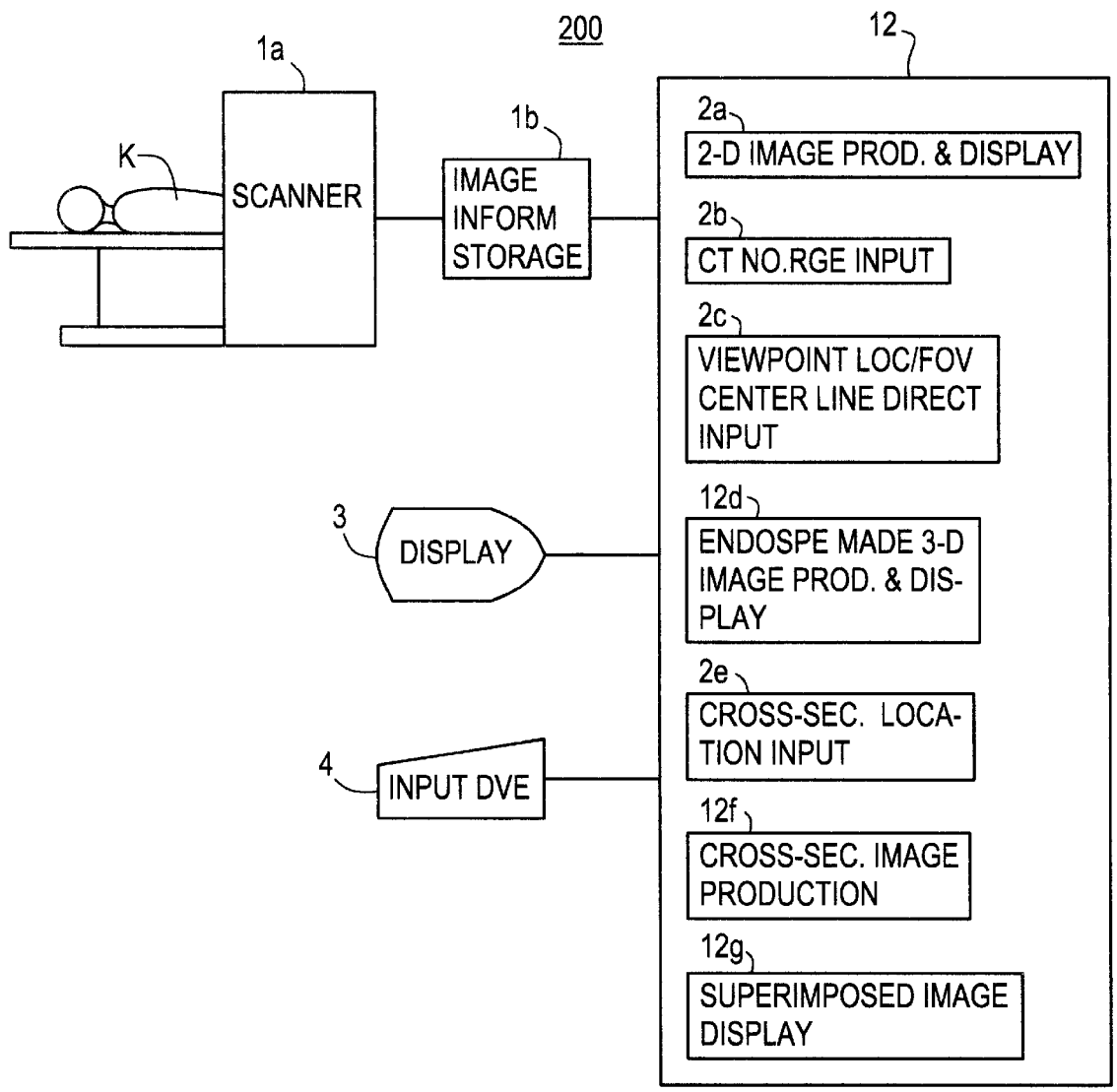
FIG. 12 is a configuration diagram showing an image display apparatus in accordance with a second embodiment of the present invention.

FIG. 12 is a configuration diagram showing an image display apparatus in accordance with a second embodiment of the present invention in combination with image information acquisition means and image information storage means in an X-ray CT apparatus.

The X-ray CT apparatus 200 comprises an image processor 12, a display 3 and an input device 4.

The image processor 12 includes a 2D image production and display portion 2a, a CT number range input portion 2b, a viewpoint location/FOV centerline direction input portion 2c, an endoscope mode 3D image production and display portion 12d, a cross-sectional location input portion 2e, a cross-sectional image production portion 12f and a superimposed image display portion 12g.

A scanner 1 scans a patient K at different slice locations and acquires scan data for a plurality of slices.

The 2D image production and display portion 2a in the image processor 12 processes the scan data for the plurality of slices to generate 2D image data for each slice, and displays a 2D image on the display 3.

The operator reads from the 2D image a CT number range of the internal body tissue (such as ventriculus or blood vessel) of which the endoscope mode 3D image is to be produced, and inputs the CT number range via the input device 4.

The CT number range input portion 2b in the image processor 12 receives the input CT number range and passes it to the endoscope mode 3D image production and display portion 12d.

The operator determines a viewpoint location in the internal space of the internal body tissue and inputs the viewpoint location via the input device 4. The FOV centerline direction is also input via the input device 4.

The viewpoint location/FOV centerline direction input portion 2c in the image processor 12 receives the input viewpoint location and FOV centerline direction and passes them to the endoscope mode 3D image production and display portion 12d.

The endoscope mode 3D image production and display portion 12d in the image processor 12 extracts from the 2D image data for each slice the pixels within the CT number range to generate 3D data of the internal body tissue, produces a 3D image (see FIG. 2) representing a wall surface of the internal body tissue as seen in the FOV which extends radially from the viewpoint toward the FOV centerline direction based on the 3D data, and displays the 3D image on the display 3.

The operator determines a cross-sectional location within a predetermined range lying near the viewpoint location, and inputs the cross-sectional location via the input device 4.

The cross-sectional location input portion 2e in the image processor 12 receives the input cross-sectional location and passes it to the cross-sectional image production portion 12f.

The cross-sectional image production portion 12f in the image processor 12 produces a cross-sectional image (see FIG. 14) of the internal body tissue in a cross section perpendicular to the FOV centerline at the cross-sectional location based on the 3D data.

The superimposed image display portion 12g in the image processor 12 combines the 3D image with the cross-sectional image to display a superimposed image (see FIG. 15) on the screen of the display 3.

Figure 13:
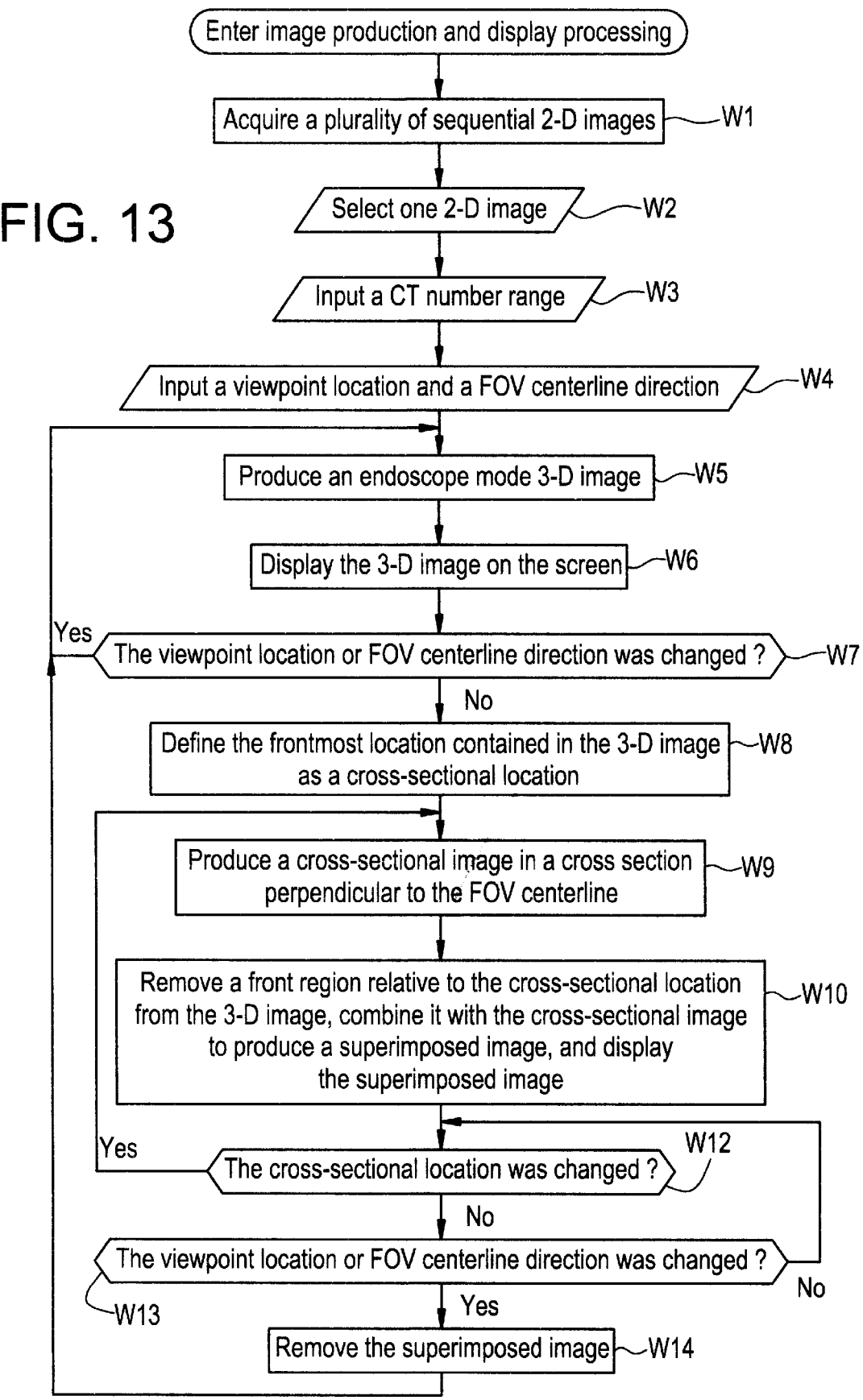
FIG. 13 is a flow chart of a procedure in which the image display apparatus shown in FIG. 12 is employed to display an endoscope mode 3D image.

FIG. 13 is a flow chart of a procedure in which the image display apparatus 201 is employed to display the endoscope mode 3D image.

In Step W1, the patient K is scanned at different slice locations, and data sets for a plurality of sequential 2D images are acquired.

The sequential 2D images S1–S7 are illustrated in FIG. 4.

In the 2D images S1–S7, reference symbol D designates the large intestine. Reference symbol K designates the lumen, i.e., the internal space of the large intestine D.

Referring to FIG. 13 again, in Step W2, the operator selects an appropriate 2D image from the sequential images using the input device 4. For example, the image S5 is selected from among the 2D images S1–S7.

In Step W3, the operator reads from the selected 2D image a CT number range of the internal body tissue (e.g., the large intestine D) of which the endoscope mode 3D image is to be produced, and inputs the CT number range. For example, if the CT number range of the pixels in the large intestine D in the 2D image S5 is "equal to or above 300", "300" is input as the minimum value of the CT number range (and, if necessary, the maximum value may be input).

In Step W4, the operator determines a viewpoint location in the internal space of the internal body tissue and inputs the viewpoint location. For example, as shown in FIG. 5, a cursor U is positioned at a point within the lumen K, the internal space of the large intestine D, and the position is selected. The FOV centerline direction is also input. For example, the "depth direction" of the displayed 2D image is specified.

Referring FIG. 13 again, in Step W5, the endoscope mode 3D image production and display portion 12d in the image processor 12 extracts from the 2D image data for each slice the pixels within the CT number range to generate 3D data of the internal body tissue, and produces a 3D image representing a wall surface of the internal body tissue as seen in the FOV which extends radially from the viewpoint toward the FOV centerline direction based on the 3D data. For example, the 3D image T shown in FIG. 2 is produced. In the drawing, reference symbol A designates a tumor developed on the wall of the large intestine D.

Referring to FIG. 13 again, in Step W6, the endoscope mode 3D image production and display portion 12d in the image processor 12 displays the 3D image T on the display 3.

In Step W7, a check is made whether the operator changed the viewpoint location or the FOV centerline direction. If a change was made, the process returns to Step W5 to update the 3D image (however, the 3D data need not be regenerated); otherwise it goes to Step W8. That is, while the viewpoint location or the FOV centerline direction is being changed, the 3D image continues to be varied according to the change, and when the change is stopped at a certain 3D image, the process goes to Step W8.

In Step W8, the cross-sectional image production portion 12f in the image processor 12 defines the frontmost location contained in the 3D image as a cross-sectional location.

Figure 14:
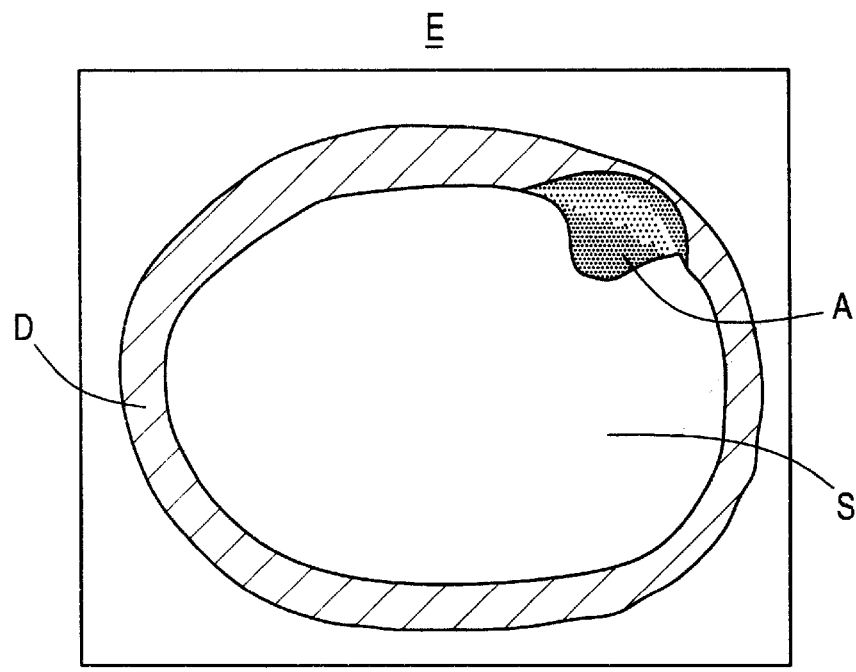
FIG. 14 is a conceptual diagram illustrating a cross-sectional image obtained by the image display apparatus shown in FIG. 12.

In Step W9, the pixels in a cross section perpendicular to the FOV centerline at the cross-sectional location are extracted from the 3D data to produce a cross-sectional image. For example, the cross-sectional image E shown in FIG. 14 is produced.

Figure 15:
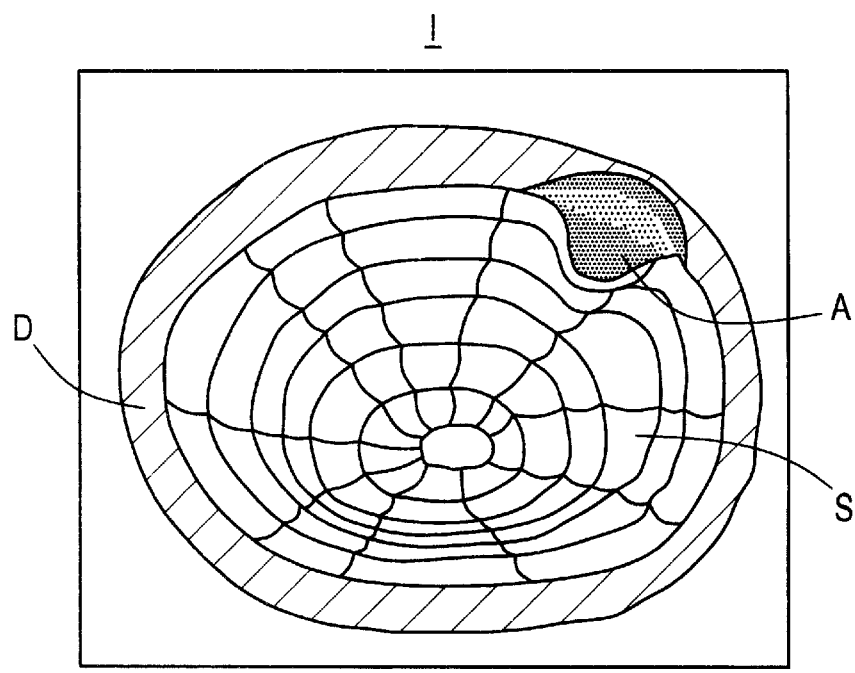
FIG. 15 is a conceptual diagram illustrating a superimposed image obtained by the image display apparatus shown in FIG. 12.

Referring to FIG. 13 again, in Step W10, the superimposed image production portion 12g in the image processor 12 removes a front region relative to the cross-sectional location from the 3D image, combines it with the cross-sectional image to produce a superimposed image, and displays the superimposed image I as shown in FIG. 15.

Referring to FIG. 13 again, in Step W12, a check is made whether the operator changed the cross-sectional location. If a change was made, the process returns to Step W9 to update the cross-sectional image, and produces and displays the superimposed image in Step W10.

In Step W13, a check is made whether the operator changed the viewpoint location or the FOV centerline direction. If a change was not made, the process returns to Step W12 to maintain the current display; otherwise it goes to Step W14.

In Step W14, the superimposed image I is removed to restore the display as shown in FIG. 6. The process then returns to Step W5. That is, when the viewpoint location or the FOV centerline direction was changed, the 3D image T is varied according to the change, and while the 3D image T is being varied, the superimposed image I is not displayed.

By using the image display apparatus 201 in accordance with the second embodiment, the endoscope mode 3D image T is displayed on the screen of the display 3, and the superimposed image I obtained by combining the 3D image T with the cross-sectional image E is displayed on the screen when the viewpoint is fixed, which enables the surface condition and the internal condition (such as CT numbers) of the tumor A to be simultaneously displayed.

Moreover, in Step W9, a tomographic image may be produced in a cross section perpendicular to the FOV centerline at the cross-sectional location based on the 2D image data, and may be combined with the 3D image for display in Step W10.

In the above embodiment, although the description is made regarding the case in which a plurality of 2D image data sets are employed to produce a 3D image, 3D volume data may be used.

Third Embodiment

Figure 16:
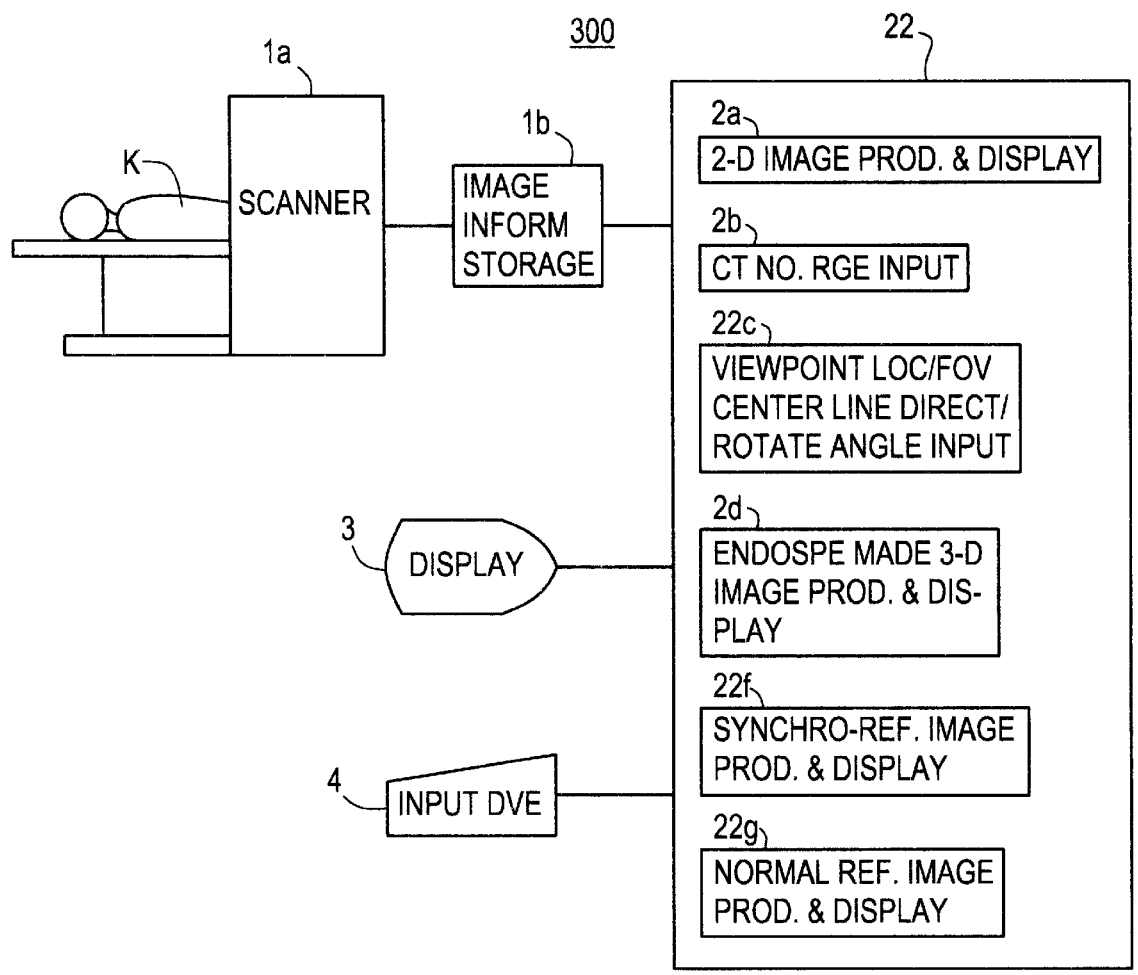
FIG. 16 is a configuration diagram showing an image display apparatus in accordance with a third embodiment of the present invention.

FIG. 16 is a configuration diagram showing an image display apparatus in accordance with a third embodiment of the present invention in combination with image information acquisition means and image information storage means in an X-ray CT apparatus.

The image display apparatus 301 comprises an image processor 22, a display 3 and an input device 4.

The image processor 22 includes a 2D image production and display portion 2a, a CT number range input portion 2b, a viewpoint location/FOV centerline direction/rotational angle input portion 22c, an endoscope mode 3D image production and display portion 2d, a synchro reference image production and display portion 22f and a normal reference image production and display portion 22g.

By "normal reference image" is meant a reference image based on a coordinate axis assumed to be fixed relative to the image information acquisition means (i.e., the scanner in this embodiment), and by "synchro reference image" is meant a reference image based on a coordinate axis assumed to be established each time according to a viewpoint location, a FOV centerline direction and a rotational angle specified during endoscope mode imaging.

A scanner 1 scans a patient K at different slice locations (a slice refers to a planar region imaged by tomography) and acquires scan data for a plurality of slices.

The 2D image production and display portion 2a in the image processor 22 processes the scan data for the plurality of slices to generate 2D image data for each slice, and displays a 2D image on the display 3.

The operator reads from the 2D image a CT number range of the internal body tissue (such as ventriculus or blood vessel) of which the endoscope mode 3D image is to be produced, and inputs the CT number range via the input device 4.

The CT number range input portion 2b in the image processor 22 receives the input CT number range and passes it to the endoscope mode 3D image production and display portion 2d.

The operator determines a viewpoint location (a virtual endoscope lens position) in the internal space of the internal body tissue and inputs the viewpoint location via the input device 4. A FOV centerline direction (an optical axis direction of a virtual endoscope lens) is also input via the input device 4. Furthermore, a rotational angle is input via the input device 4. (The rotational angle represents a rotational angle around a pivot of the endoscope. When the rotational angle is 0°, the screen vertical axis of the display 3 displaying the endoscope mode 3D image corresponds to the spatial vertical axis, and when the rotational angle is 90°, the screen horizontal axis of the display 3 displaying the endoscope mode 3D image corresponds to the spatial horizontal axis.)

The viewpoint location/FOV centerline direction/rotational angle input portion 22c in the image processor 22 receives the input viewpoint location, FOV centerline direction and rotational angle, and passes them to the endoscope mode 3D image production and display portion 2d.

The endoscope mode 3D image production and display portion 2d in the image processor 22 extracts from the 2D image data for each slice the pixels within the CT number range in the FOV which extends radially from the viewpoint location toward the FOV centerline direction to produce a 3D image as viewing a wall surface of the internal body tissue, and displays the 3D image on the display 3. The orientation of the display of the 3D image is determined so that the spatial direction corresponding to the rotational angle coincides with the screen vertical axis.

The operator specifies and inputs via the input device 4 which of the normal reference image and the synchro reference image is to be displayed as a reference image.

If the operator selects the normal reference image display, the normal reference image production and display portion 22g in the image processor 22 produces a tomographic image in a plane parallel to the x-y plane shown in FIG. 4 and passing through the viewpoint location based on the 2D image data, and displays the image as a normal axial image. The normal reference image production and display portion 22f also produces a tomographic image in a plane parallel to the z-y plane shown in FIG. 4 and passing through the viewpoint location, and displays the image as a normal sagittal image. Furthermore, the normal reference image production and display portion 22f produces a tomographic image in a plane parallel to the z-x plane shown in FIG. 4 and passing through the viewpoint location, and displays the image as a normal coronal image.

Figure 23:
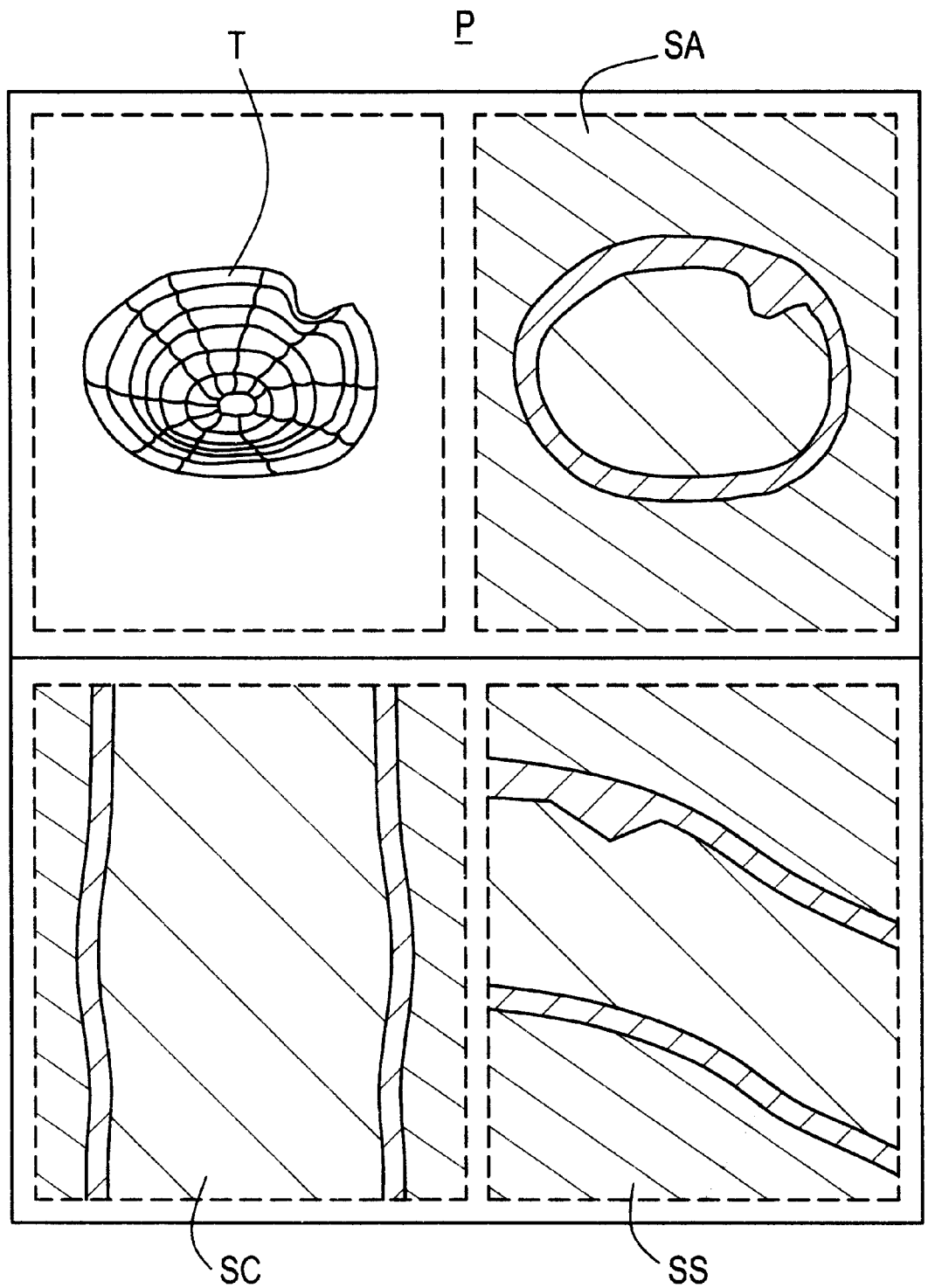
FIG. 23 is a schematic diagram showing the 3D image and reference images obtained by the image display apparatus shown in FIG. 16.

On the other hand, if the operator selects the synchro reference image display, the synchro reference image production and display portion 22f in the image processor 22 produces a tomographic image in a plane perpendicular to the FOV centerline and passing through the viewpoint location (SAP in FIG. 20) based on the 2D image data, and displays the image as a synchro axial image (SA in FIG. 23). The synchro reference image production and display portion 22g also produces a tomographic image in a plane parallel to the spatial axis which corresponds to the screen vertical axis of the display 3 displaying the 3D image, and containing the viewpoint location and the FOV centerline (SSP in FIG. 21), and displays the image as a synchro sagittal image (SS in FIG. 23). Furthermore, the synchro reference image production and display portion 22g produces a tomographic image in a plane parallel to the spatial axis which corresponds to the screen horizontal axis of the display 3 displaying the 3D image, and containing the viewpoint location and the FOV centerline (SCP in FIG. 21), and displays the image as a synchro coronal image (SC in FIG. 23).

Figure 17:
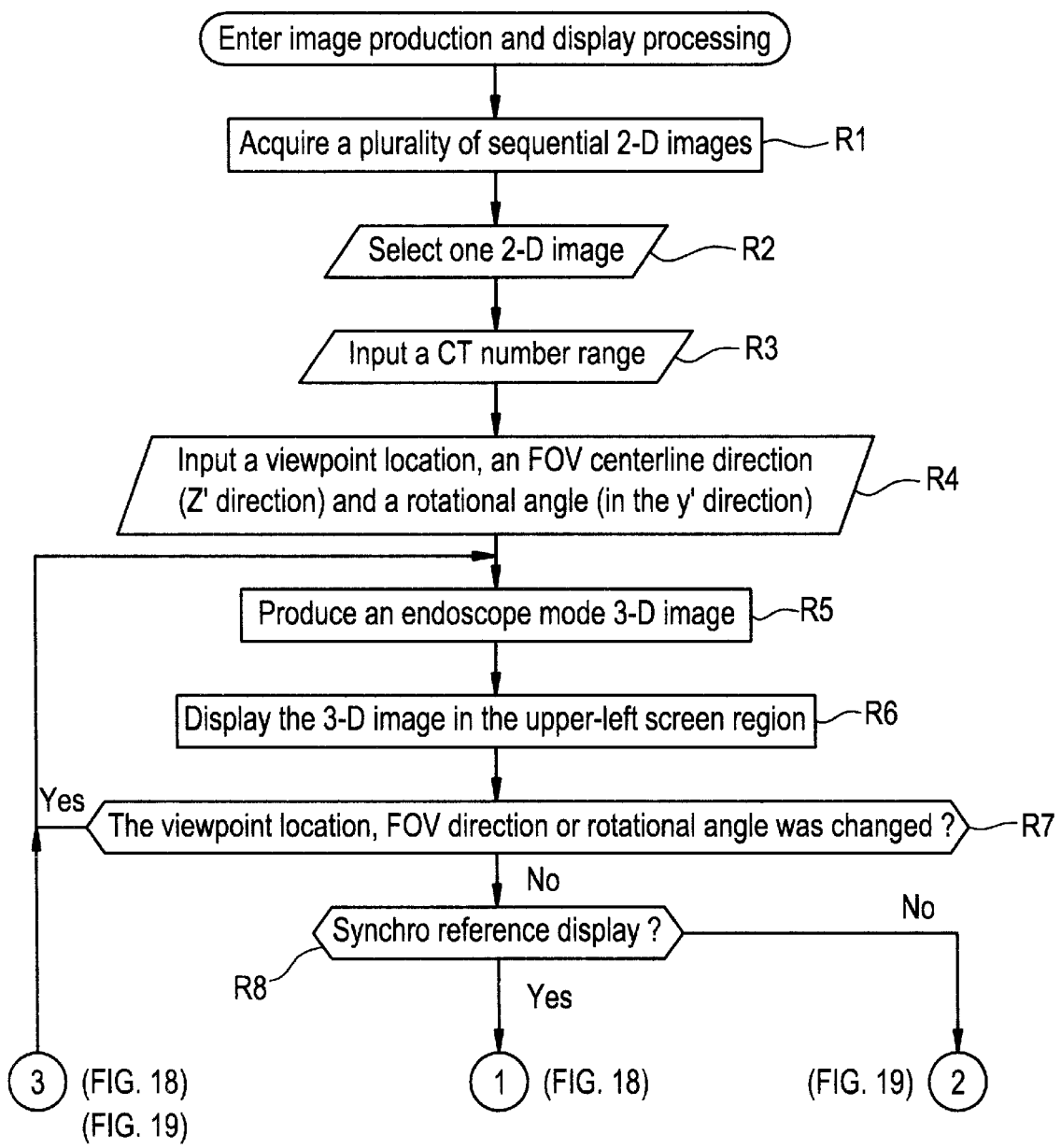
FIG. 17 is a flow chart of a procedure in which the image display apparatus shown in FIG. 16 is employed to display an endoscope mode 3D image.
Figure 18:
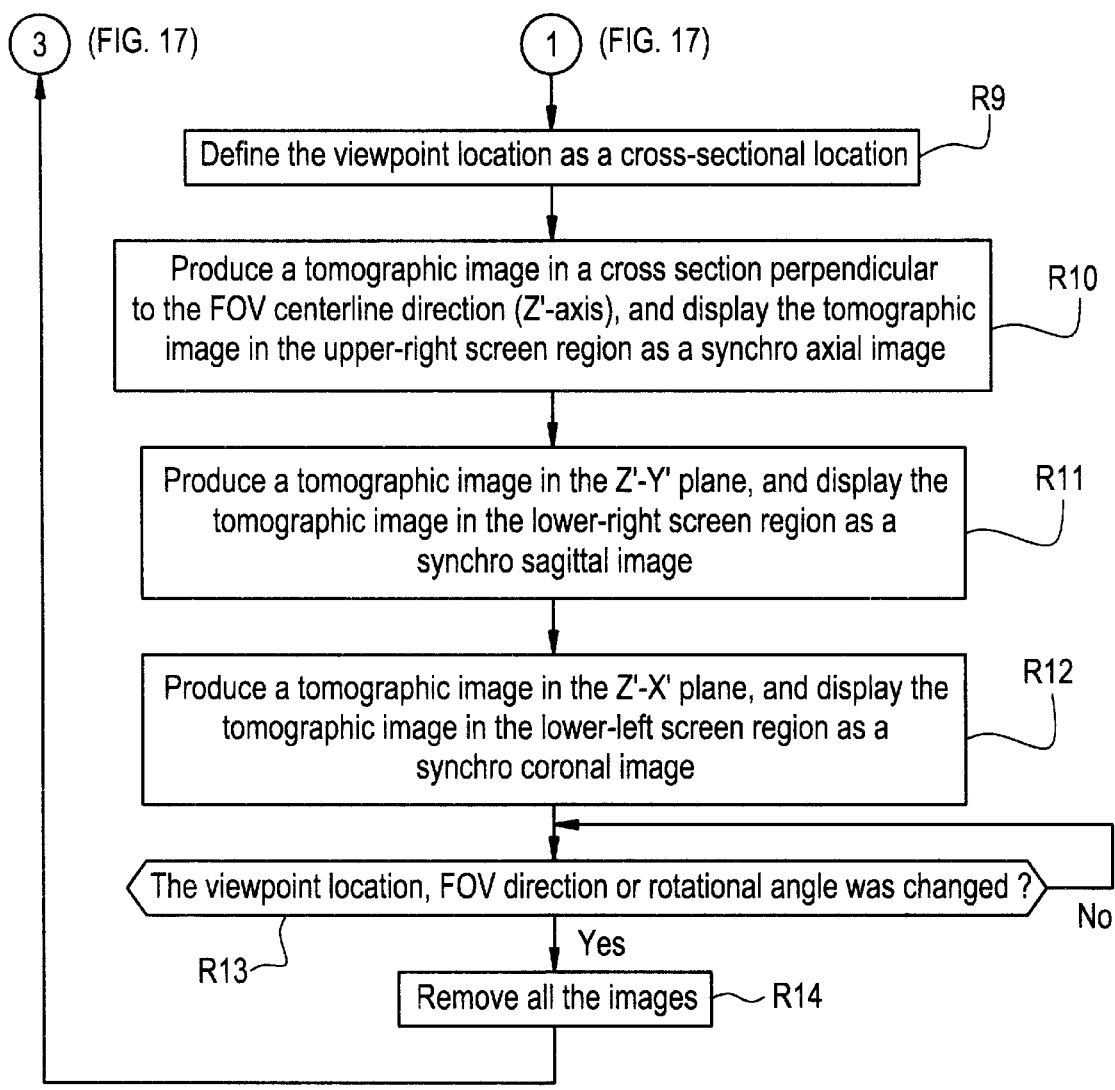
FIG. 18 is a flow chart continued from the flow chart shown in FIG. 17.
Figure 19:
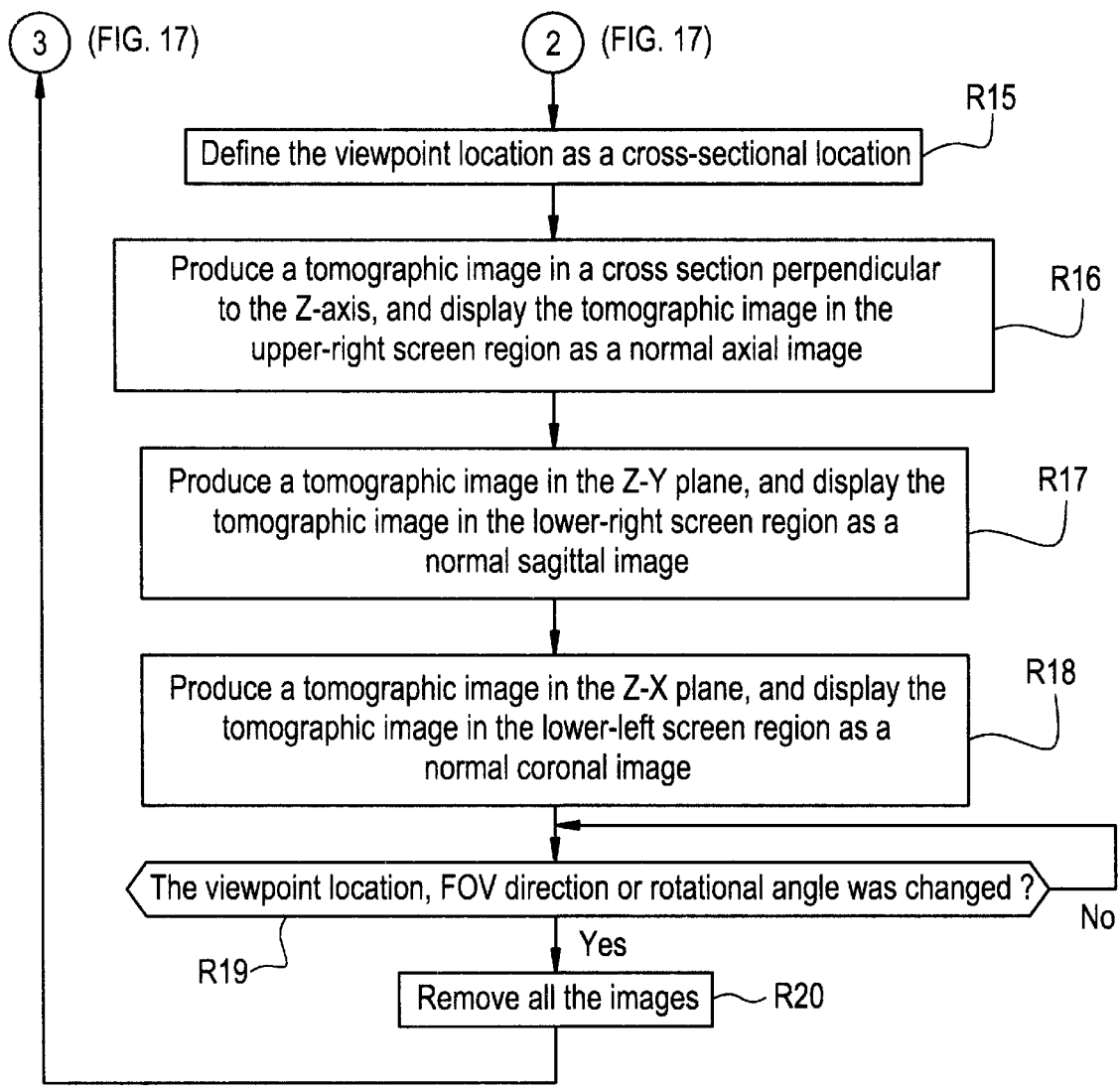
FIG. 19 is another flow chart continued from the flow chart shown in FIG. 17.

FIGS. 17–19 are flow charts of a procedure in which the image display apparatus 301 is employed to display the endoscope mode 3D image.

In Step R1, the patient K is scanned at different slice locations, and data sets for a plurality of sequential 2D images are acquired.

The sequential 2D images S1–S7 are illustrated in FIG. 4.

In the 2D images S1–S7, reference symbol D designates the large intestine. Reference symbol K designates the lumen, i.e., the internal space of the large intestine D.

Each 2D image S1–S7 is a tomographic image in a plane perpendicular to the z-axis. The z-axis is the axis along which the patient K is moved in the scanner 1, the x-axis is the horizontal axis perpendicular to the z-axis, and the y-axis is the vertical axis perpendicular to the z-axis.

Referring to FIG. 17 again, in Step R2, the operator selects an appropriate 2D image from the sequential images using the input device 4. For example, the image S5 is selected from among the 2D images S1–S7.

In Step R3, the operator reads from the selected 2D image a CT number range of the internal body tissue (e.g., the large intestine D) of which the endoscope mode 3D image is to be produced, and inputs the CT number range. For example, if the CT number range of the pixels in the large intestine D in the 2D image S5 is "equal to or above 300", "300" is input as the minimum value of the CT number range (and, if necessary, the maximum value may be input).

In Step R4, the operator determines a viewpoint location in the internal space of the internal body tissue and inputs the viewpoint location. For example, as shown in FIG. 5, a cursor U is positioned at a point within the lumen K, the internal space of the large intestine D, on the 2D image S5, and the position is selected. The FOV centerline direction and the rotational angle are also input. For example, if the home position is input via a keyboard of the input device 4, the FOV centerline direction is +z direction and the rotational angle is 0°. Furthermore, if a track ball in the input device 4 is rotated, the FOV centerline direction and the rotational angle can be rotated to establish a coordinate axis corresponding to the endoscope mode.

Referring FIG. 17 again, in Step R5, the endoscope mode 3D image production and display portion 2d in the image processor 22 extracts from the 2D image data for each slice the pixels within the CT number range in the FOV which extends radially from the viewpoint toward the FOV centerline direction to produce a 3D image as viewing a wall surface of the internal body tissue.

In Step R6, the endoscope mode 3D image production and display portion 2d in the image processor 22 displays a 3D image T in the upper-left screen region with a display orientation such that a spatial direction corresponding to the rotational angle coincides with the axis perpendicular to the display screen, as shown in FIG. 23.

In Step R7, a check is made whether the operator changed the viewpoint location, the FOV centerline direction or the rotational angle. If a change was made, the process returns to Step R5 to update the 3D image; otherwise it goes to Step R8. That is, while the viewpoint location, the FOV centerline direction or the rotational angle is being changed, the 3D image continues to be varied according to the change, and when the change is stopped at a certain 3D image, the process goes to Step R8.

In Step R8, a check is made whether the operator specified the synchro reference image as a reference image. If so specified, the process goes to Step R9 in FIG. 18, otherwise to Step R15 in FIG. 19.

In Step R9 in FIG. 18, the synchro reference image production and display portion 22f in the image processor 22 defines the viewpoint location as a cross-sectional location.

Figure 20:
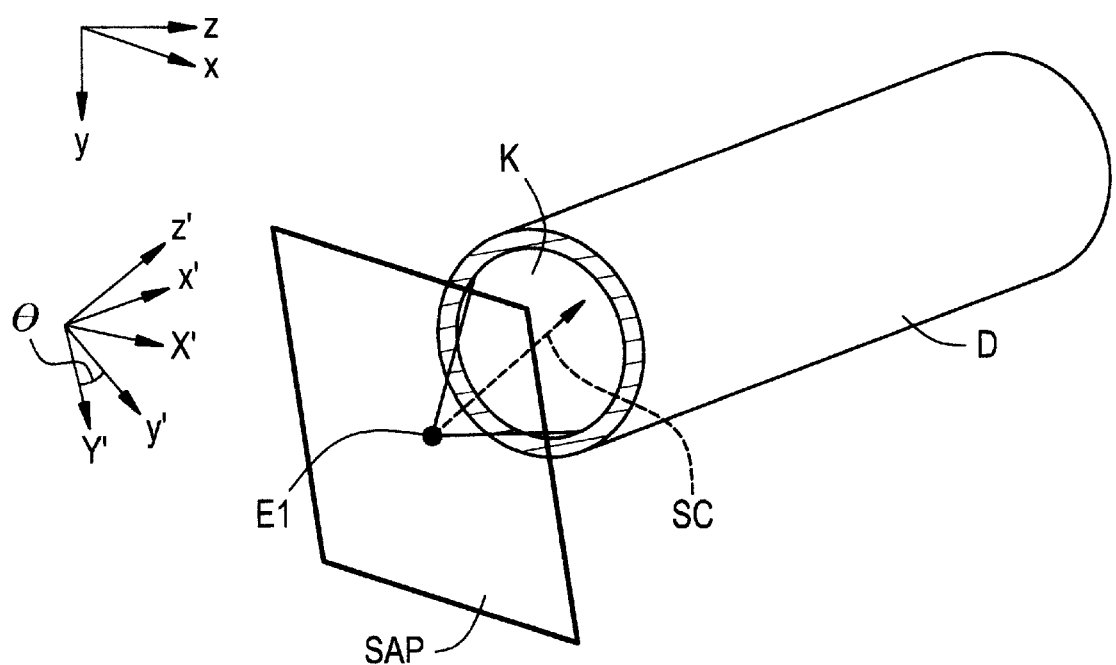
FIG. 20 is an explanatory diagram illustrating a synchro axial plane.

In Step R10, the synchro reference image production and display portion 22f extracts from the 2D image data the pixels in the synchro axial plane SAP perpendicular to the FOV centerline SC and containing the viewpoint E1 as shown in FIG. 20 to produce a tomographic image, and displays the image in the upper-right screen region as a synchro axial image SA as shown in FIG. 23.

FIG. 20 illustrates the relationship among the internal body tissue (i.e., the large intestine in this example) which is an object for image display, the coordinate system (x, y, z) assumed to be fixed relative to the image information acquisition means, and the coordinate systems (x', y', z') and (X', Y', z') established each time the endoscope mode is executed.

In FIG. 20, the z'-axis is a coordinate axis parallel to the FOV center axis SC. The Y'-axis is an axis which is contained within the z-y plane and perpendicular to the z'-axis, and the y'-axis is an axis which is formed by rotating the Y'-axis by the rotational angle θ around the z'-axis. The X'-axis is an axis which is perpendicular to the z'-axis and the Y'-axis, and the x'-axis is an axis which is perpendicular to the z'-axis and the y'-axis.

Figure 21:
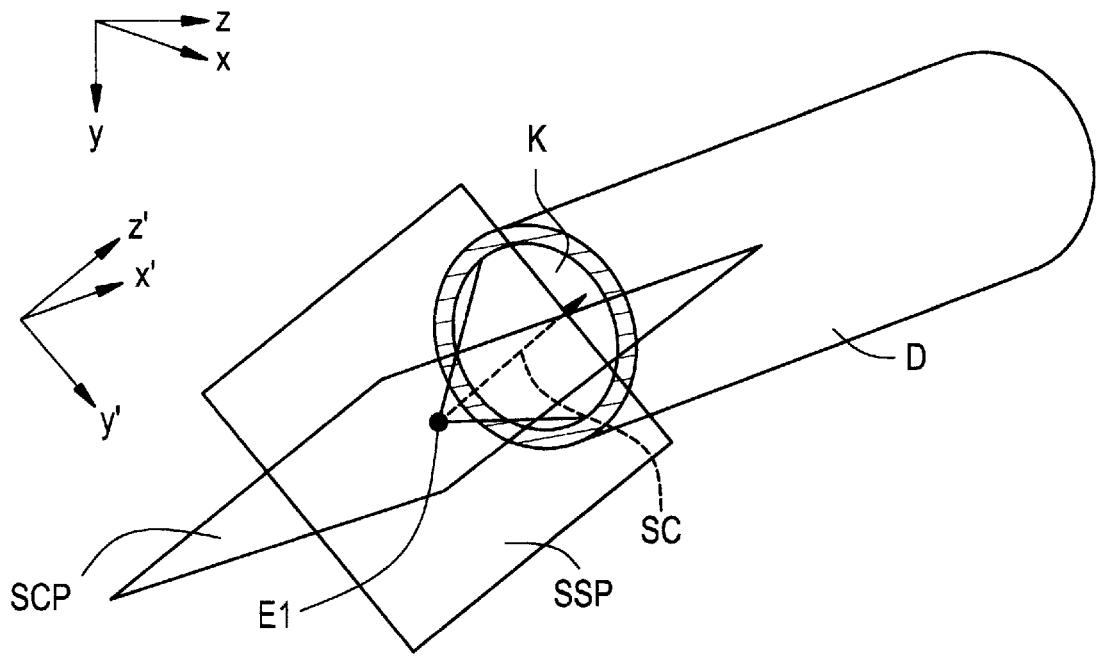
FIG. 21 is an explanatory diagram illustrating a synchro sagittal plane and a synchro coronal plane.

Referring to FIG. 18 again, in Step R11, the synchro reference image production and display portion 22f extracts from the 2D image data the pixels in the synchro sagittal plane SSP parallel to the z'-y' plane and containing the viewpoint E1 as shown in FIG. 21 to produce a tomographic image, and displays the image in the lower-right screen region as a synchro sagittal image SS as shown in FIG. 23.

Referring to FIG. 18 again, in Step R12, the synchro reference image production and display portion 22f extracts from the 2D image data the pixels in the synchro coronal plane SCP parallel to the z'-x' plane and containing the viewpoint E1 as shown in FIG. 21 to produce a tomographic image, and displays the image in the lower-left screen region as a synchro coronal image SC as shown in FIG. 23.

Referring FIG. 18 again, in Step R13, a check is made whether the operator changed the viewpoint location, the FOV centerline direction or the rotational angle. If a change was made, the process goes to Step R14; otherwise it maintains the current display.

In Step R14, all of the images are removed, and the process returns to Step R5 in FIG. 17.

When "NO" is selected in Step R8 in FIG. 17, the normal reference image production and display portion 22g in the image processor 22 defines the visual position as a cross-sectional location in Step R15 in FIG. 19.

Figure 22:
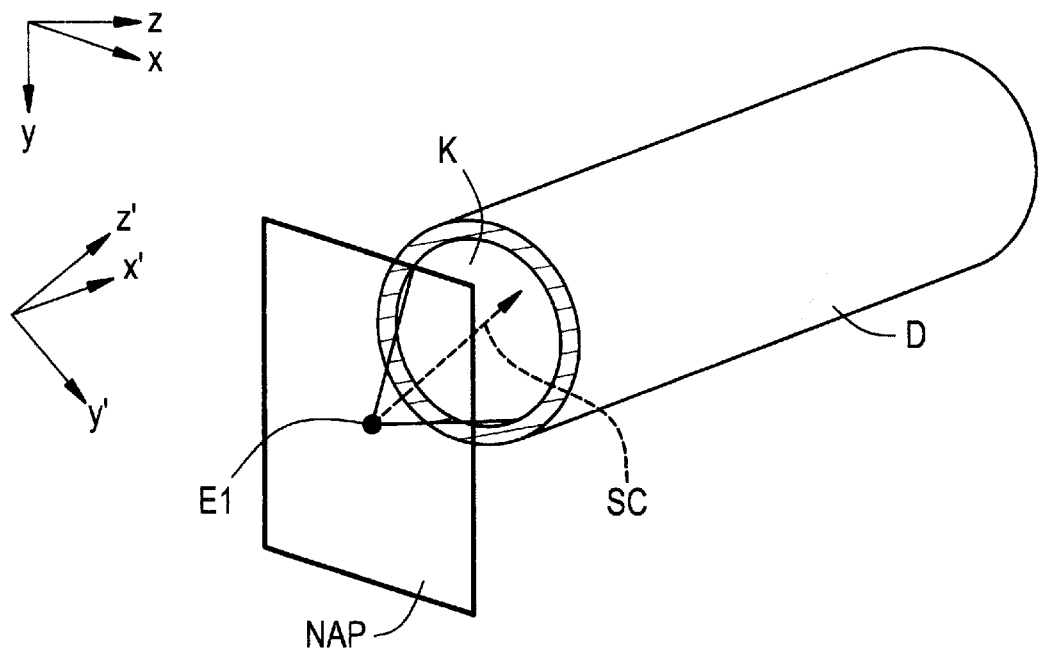
FIG. 22 is an explanatory diagram illustrating a normal axial plane.

In Step R16, the normal reference image production and display portion 22g extracts from the 2D image data the pixels in the normal axial plane NAP perpendicular to the z-axis and containing the viewpoint E1 as shown in FIG. 22 to produce a tomographic image, and displays the image in the upper-right screen region as a normal axial image.

Referring to FIG. 19 again, in Step R17, the normal reference image production and display portion 22g extracts from the 2D image data the pixels in a plane parallel to the z-y plane and containing the viewpoint E1 to produce a tomographic image, and displays the image in the lower-right screen region as a normal sagittal image.

In Step R18, the normal reference image production and display portion 22g extracts from the 2D image data the pixels in a plane parallel to the z-x plane and containing the viewpoint E1 to produce a tomographic image, and displays the image in the lower-left screen region as a normal coronal image.

In Step R19, a check is made whether the operator changed the viewpoint location, the FOV centerline direction or the rotational angle. If a change was made, the process goes to Step R20; otherwise it maintains the current display.

In Step R20, all of the images are removed, and the process returns to Step R5 in FIG. 17.

By using the image display apparatus 301 in accordance with the third embodiment, the endoscope mode 3D image T is displayed on the screen of the display 3, and the reference images are displayed in the other screen regions when the viewpoint is fixed. This enables the operator to spatially recognize the current FOV centerline direction clearly.

Although the above embodiments describe cases in which a scanner of an X-ray CT apparatus is employed as image information acquisition means and the image display apparatus of the present invention forms part of the X-ray CT apparatus system, the image display apparatus of the present invention can be operated separately from the image information acquisition means so long as the image display apparatus is placed under circumstances in which the apparatus can access systematically stored image information.

Also, although the above embodiments describe cases in which a scanner of an X-ray CT apparatus is employed as image information acquisition means, the image information on the human internal body tissue may be acquired by any other means, such as an MRI (magnetic resonance imaging) apparatus.

Moreover, although the image information acquisition means and the image information storage means are described as being conceptually separated, they can also be understood to be included in an image diagnostic apparatus system, such as an X-ray CT apparatus or an MRI apparatus.

Furthermore, since a scanner of an X-ray CT system is employed as image information acquisition means in the above embodiments, a step for inputting the CT value as a parameter representing the image signal intensity is included in the image display process, but what should be input as such a parameter may be appropriately selected according to the image information acquisition means employed, including whether the step for inputting such a parameter is to be included in the process.

Additionally, large intestine tissue is cited as an object to be displayed in the description of the above embodiments, but the image display method in accordance with the present invention applies suitably to any other tissue which may have a cavity therein, such as small intestine, stomach, esophagus, trachea, urethra, vagina, uterus or oviduct.

Many widely different embodiments of the invention may be configured without departing from the spirit and the scope of the present invention. It should be understood that the present invention is not limited to the specific embodiments described in the specification, except as defined in the appended claims.

What is claimed is:

1. An image display method comprising the steps of:
    producing a 3D image representing a wall surface of a 3D tissue as seen from a viewpoint lying in an internal space formed by said 3D tissue;
    producing a tomographic image of said 3D tissue at a cross-sectional location defined as lying near said viewpoint, or producing a 2D image obtained by processing said tomographic image and removing a 3D image region therefrom; and
    displaying on a common display said tomographic image or said 2D image juxtaposed or superimposed with said 3D image, so that surface and internal conditions of an object being examined are concurrently displayed.

2. An image display apparatus comprising:
    3D image production means for producing a 3D image representing a wall surface of a 3D tissue as seen from a viewpoint lying in an internal space formed by said 3D tissue;
    2D image production means for producing a tomographic image of said 3D tissue at a cross-sectional located defined as lying near said viewpoint or for producing a 2D image obtained by processing said tomographic image and removing 3D image regions therefrom; and
    image display means for displaying on a common screen said tomographic image or said 2D image juxtaposed or superimposed with said 3D image so that surface and internal conditions of an object being examined are concurrently displayed.

3. The apparatus of claim 2, wherein said 3D image production means comprises means for producing 3D image from data sets for a plurality of tomographic images of said 3D tissue.

4. The apparatus of claim 3, wherein said 3D image production means comprises means for producing said 3D image from said viewpoint, and a field of view centerline direction from said viewpoint, or additionally, with a solid angle from said viewpoint.

5. The apparatus of claim 4, wherein said 3D image production means comprises means for using one of a plurality of tomographic images to define said viewpoint.

6. The apparatus of claim 3, wherein said 2D image production means comprises means for using one of a plurality of tomographic images.

7. The apparatus of claim 3, wherein said 2D image production means comprises means for producing said 2D image by performing an interpolation calculation on said tomographic image.

8. The apparatus of claim 4, wherein said 2D image is perpendicular to said field of view centerline direction.

9. The apparatus of claim 4, wherein at least one of the following is changed, the viewpoint, the field of view centerline direction and the solid angle, and wherein said 3D image production means produces a new 3D image according to said change, and wherein said 2D image production means produces a new 2D image according to said change.

10. An image display method comprising the steps of:
    producing a 3D image representing a wall surface of a 3D tissue as seen from a viewpoint lying in an internal space formed by said 3D tissue;
    producing a tomographic image in a synchro-axial plane perpendicular to a field of view center line direction and containing a cross-sectional location defined as lying at or near said viewpoint, a tomographic image in a plane orthogonal to said synchro-axial plane and containing said view of view center line, or producing a 2D image by processing said tomographic images and removing 3D image regions therefrom; and
    displaying said tomographic images or said 2D image juxtaposed or superimposed with said 3D image, so that surface and internal conditions of an object being examined are concurrently displayed.

11. An image display apparatus comprising:
    3D image production means for producing a 3D image representing a wall surface of a 3D tissue as seen from a viewpoint lying in an internal space formed by said 3D tissue;
    2D image production means for producing a tomographic image in a synchro-axial plane perpendicular to a field of view centerline direction and containing a cross-sectional location defined as lying at or near said view point, a tomographic image in a plane orthogonal to said synchro-axial plane and containing said field of view center line, or for producing a 2D image obtained by processing said tomographic images and removing 3D image regions therefrom; and
    image display means for displaying on a common display said tomographic images or said 2D image juxtaposed or superimposed with said 3D image, so that surface and internal conditions of an object being examined are concurrently displayed.

12. The apparatus of claim 11, wherein said 3D image production means comprises means for producing said 3D image from data sets for a plurality of tomographic images of said 3D tissue.

13. The apparatus of claim 12, wherein said 3D image production means comprises means for producing said 3D image from said viewpoint, and a field of view center line direction from said viewpoint, or additionally, with a solid angle from said viewpoint.

14. The apparatus of claim 13, wherein said 3D image production means comprises means for using one of a plurality of tomographic images to define said viewpoint.

15. The apparatus of claim 11, wherein said 2D image production means comprises means for performing interpolation calculation on said tomographic images in a plurality of synchro-axial planes.

16. The apparatus of claim 11, wherein said tomographic image in a plane orthogonal to said synchro-axial plane corresponds to a variable position of said plane.

17. The apparatus of claim 16, wherein said display means comprises means for displaying a position corresponding to said tomographic image in said synchro-axial plane on said tomographic image in a plane orthogonal to said synchro-axial plane, or on said 2D image obtained by processing said tomographic images.

18. The apparatus of claim 11, wherein at least one of the following is changed, the view point, the field of view center line direction, and the solid angle, and wherein said 2D image production means produces a new tomographic image in said synchro-axial plane and a new tomographic image in a plane orthogonal to said synchro-axial plane according to said change, and wherein said 2D image production means produces a new 2D image by processing said tomographic images produced according to said change, and wherein said 3D image production means produces a new 3D image according to said change.

* * * * *